United States Patent [19]

Bolick, Jr.

[11] 4,232,444
[45] Nov. 11, 1980

[54] FLAT CABLE STRIPPING AND TERMINATING TECHNIQUE

[75] Inventor: Virgil T. Bolick, Jr., Asheville, N.C.

[73] Assignee: Akzona Incorporated, Asheville, N.C.

[21] Appl. No.: 907,447

[22] Filed: May 19, 1978

[51] Int. Cl.³ .......................................... H01R 43/04
[52] U.S. Cl. ...................................... 29/863; 29/426.4
[58] Field of Search ................ 29/624, 628, 426, 427, 29/748, 753, 33 M, 423, 863; 339/176 MF, 17 F; 174/117 F; 81/9.51; 206/444

[56] References Cited

U.S. PATENT DOCUMENTS

| | | | |
|---|---|---|---|
| 252,634 | 1/1882 | Waring | 29/624 |
| 3,663,739 | 5/1972 | Chevrier | 174/117 F X |
| 3,736,366 | 5/1973 | Wittenberg | 174/117 F X |
| 3,751,801 | 8/1973 | Praeger et al. | 29/628 |
| 3,775,552 | 11/1973 | Schumacher | 174/105 R |
| 3,864,011 | 2/1975 | Huber | 339/176 MF X |
| 4,038,693 | 7/1977 | Huffine et al. | 206/444 X |
| 4,040,704 | 8/1977 | Huber | 339/176 MF X |
| 4,154,977 | 5/1979 | Verma | 29/423 X |
| 4,155,613 | 5/1979 | Brandeau | 174/36 X |

FOREIGN PATENT DOCUMENTS 7506800 6/1975 Netherlands .................. 29/748

*Primary Examiner*—Francis S. Husar
*Assistant Examiner*—C. J. Arbes
*Attorney, Agent, or Firm*—Francis W. Young; David M. Carter

[57] ABSTRACT

There is provided a method for stripping the jacket from a multi-pair flat cable having a plurality of coplanar insulated conductors. Each side of the jacket of the cable is scored near the end to be terminated. The alternate conductors are separated into two groups pointing in two different directions extending a certain distance from the end of the cable. The first group of conductors is pulled in a direction away from the second group, thereby separating one side of the jacket of the cable from the other. Each side of the separated jacket is peeled away from the conductors on both sides of the cable, starting at the scorings and moving away from the end of the cable. The cable conductors may then be readily gang terminated to a connector.

11 Claims, 9 Drawing Figures

FLAT CABLE STRIPPING AND TERMINATING TECHNIQUE

BACKGROUND OF THE INVENTION

This invention relates to an improved stripping and terminating technique for flat cable. More particularly, it relates to an improved technique for stripping the jacket from multi-conductor flat telephone cable, enabling gang termination to a standard telephone connector.

Telephone hand sets in business offices are normally connected to a distribution box by means of 25 pair band marked distribution (BMD) cable. This BMD cable consists of twisted pairs of individually insulated wires, each pair having a tip and ring conductor. The cable jacket is round and the individual pairs are distinguished from one another by color coding. There are at least two major problems in the use of this BMD cable in a business office. One is that the BMD cable is cumbersome, that is, it is rather thick, and normally lies across the floor rather than being placed under the carpet in the office. The other problem arises in terminating the BMD cable to a connector such as the 25 pair Champ made by AMP, Inc. or the Blue Ribbon made by the Amphenol Company. Each wire of the BMD cable must be identified by its color coding and placed by hand into an individual termination slot in the connector, which is a very tedious and costly procedure. Some of the problems of the bulky, cumbersome BMD cable have been solved by the recent development of a flat cable having multi-pair coplaner conductors, which are particularly adapted to be placed under carpets in business offices. This flat cable is further adapted to be mass terminated rather than having individual wires hand-terminated. The above-mentioned flat cable is described and claimed in U.S. Pat. No. 4,155,613 issued May 22, 1979, titled Multi-Pair Flat Telephone Cable with Improved Characteristics, and assigned to Akzona Incorporated, the assignee of the present invention.

The cable described in U.S. Pat. No. 4,155,613 utilizes a jacket made from a mixture of a plastic and electrically conductive carbon black forming a semi-conductive material. By using this semi-conductive material as a jacket for flat cable, cross talk between pairs of conductors is substantially reduced. This flat cable has at least as good or better cross-talk characteristics as the BMD cable. And, of course, the cross-talk characteristics of the above-mentioned flat cable is much better than cross-talk characteristics of an ordinary flat cable which does not have the semi-conductive jacket. A cross-section of the cable described and claimed in U.S. Pat. No. 4,155,613, May 22, 1979, is shown in FIG. 1.

FIG. 1 shows cable 1 having a plurality of pairs 2 of insulated conductors. Insulation 3 about each conductor may be a known electrical insulation material such as polypropylene. The jacket 4 which surrounds each pair in the cable includes a mixture of an electrically conductive carbon black and a plastic such as polyvinylchloride. The jacket is thus made electrically semi-conductive. There is also provided an insulation sheathing 5, which may be Mylar. By the use of this semi-conductive plastic material as a cross-talk reduction jacket, most of the problems associated with BMD cable, as well as ordinary flat cable, particularly those regarding the bulkiness of the BMD cable and poor cross-talk qualities of ordinary flat cable have been solved.

However, particular problems have come up regarding the stripping of this semi-conductive jacket and mass terminating the cable to a connector. Most of these problems are due to the fact that the jacket 4 itself conducts electricity. By using ordinary cable stripping techniques such as abrasion, the insulation 3 around the individual conductors, as well as the jacket, may be stripped off, thus permitting the conductive plastic 4 to come in contact with conductors 6. This contact could cause short circuits in the cable. Furthermore, in telephone applications where each pair includes a tip conductor 9 and a ring conductor 10, in order to utilize a known termination tool such as the AMP Champ Cable to Connector tool, also known as MI-1, and which is shown in FIG. 8, it is necessary to place the tip conductors on one side 7 of the tool and the ring conductors on the other side 8 of the tool. That is, the tip and ring conductors must be moved to separate planes in order to terminate them. If this separation and termination must be done for each individual conductor by hand, many of the advantages of using flat cable would be lost.

It is believed that applicant has solved the above problems in his invention set forth below.

OBJECTS OF THE INVENTION

It is one object of this invention to provide an improved cable jacket stripping technique.

It is another object to provide a method of stripping the outer jacket from a multi-conductor flat cable for readily gang terminating the cable to a connector.

It is another object of the invention to provide an improved flat cable jacket stripping technique wherein the jacket, which is conductive, is not permitted to come in contact with bare conductors or connector terminals.

It is another object to provide a simple, inexpensive method of stripping and mass terminating a multi-conductor cable.

It is another object to provide a method of stripping the jacket from a flat cable while maintaining alignment of the conductors being terminated.

SUMMARY OF THE INVENTION

There is provided a method of stripping the jacket from a multi-conductor flat cable. Each side of the cable jacket is scored across the width a first predetermined distance from the near end of the cable to a jacket depth reaching the outer sides of the insulated conductor. The alternate insulated conductors are separated at the end of the cable into two groups, each member of a group pointing in the same direction, but in a direction different from members of the other group. The conductor groups extend in each direction a second predetermined distance from the end of the cable. The conductor groups are then each pulled in a direction away from each other, thereby separating one side of the cable from the other for a certain distance along the cable. The jacket is peeled away from the conductors on both sides of the cable from the scorings in a direction away from the end of the cable, thereby exposing the insulated conductors. The insulated conductors may then be gang terminated to a connector.

BRIEF DESCRIPTION OF THE DRAWINGS

The subject matter which is regarded as the invention is set forth in the appended claims. The invention itself, however, together with further objects and advantages thereof, may be better understood by reference to the following description taken in conjunction with the accompanying drawings in which:

DESCRIPTION OF THE PREFERRED EMBODIMENT

Figure 1:
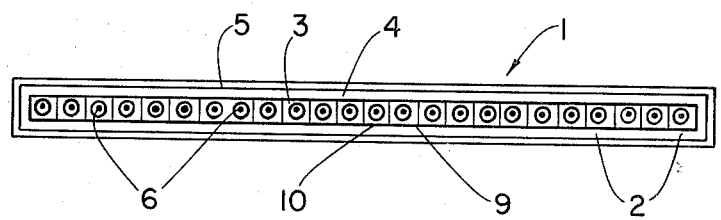
FIG. 1 is a cross-sectional view of a flat telephone cable which is particularly adapted to be stripped by the method set forth in the present invention.

Referring now more particularly to FIG. 1, there is provided a multi-conductor flat cable 1 including a plurality of pairs 2 of coplaner conductors. Each conductor is insulated by appropriate electrical insulation 3. In one embodiment, the individual conductor insulation is polypropylene. Jacket 4 surrounds each pair of the insulated conductors. The jacket, in this embodiment, is made of a mixture of a plastic such as polyvinylchloride and electrically conductive carbon black, thus forming a semi-conductive plastic jacket. Since the jacket 4 of this particular cable is electrically conductive, it is covered by an outer jacket 5 made of an electrical insulator such as Mylar.

In this embodiment, the flat cable herein described is useful to interconnect telephones to circuit panels in business offices. The particular cable shown in FIG. 1 is more completely described in U.S. Pat. No. 4,155,613 issued May 22, 1979, and assigned to Akzona Incorporated, the assignee of the present application. In any event, the cable described in reference to FIG. 1 is available from the Brand-Rex Company, a part of Akzona Incorporated, and is known as "Under Carpet Telephone Cable"; however, other flat cable having a plurality of coplanar conductors may be stripped and terminated using the method in accordance with the present invention.

Figure 2:
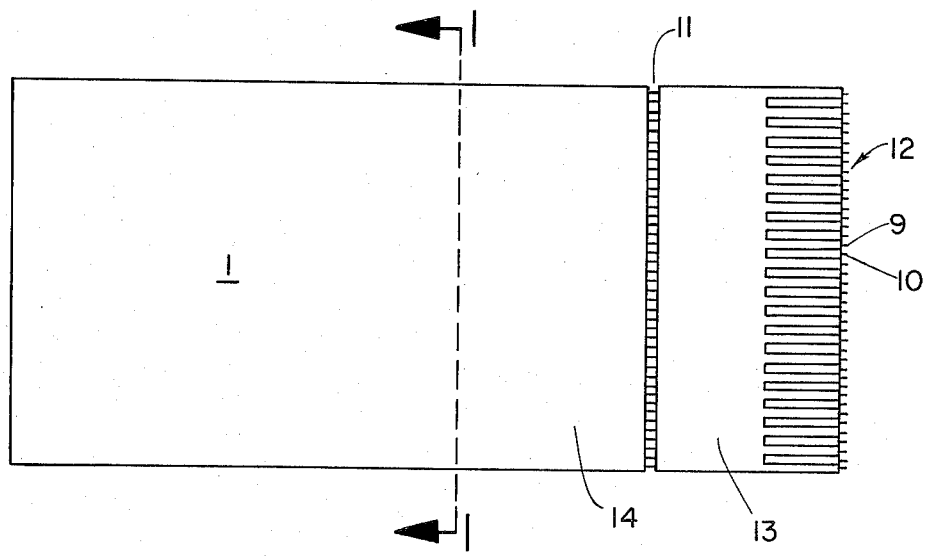
FIG. 2 has a top plan view of a portion of the cable of FIG. 1.

As can be seen from FIG. 2, the flat cable 1 is scored across the width of the cable approximately one inch from the cable end 12, which is the end to be terminated. The scoring 11 may be accomplished with a sharp knife or razor blade, and the jacket 4 is pierced to a depth reaching one side of the insulated conductor. The width of scoring 11 shown in FIG. 2 is exaggerated for illustration purposes. Furthermore, the other side (not shown) of the cable is also scored down to a depth reaching the other side of the insulated conductors. Thus, after scoring, the cable is divided into a near end 13 (termination end) and a far end 14, which, of course, also applies to the other side of the cable. FIG. 2 also shows that the conductors have been forced alternately up and down by the tool as shown in FIG. 3, which will be explained below.

Figure 3:
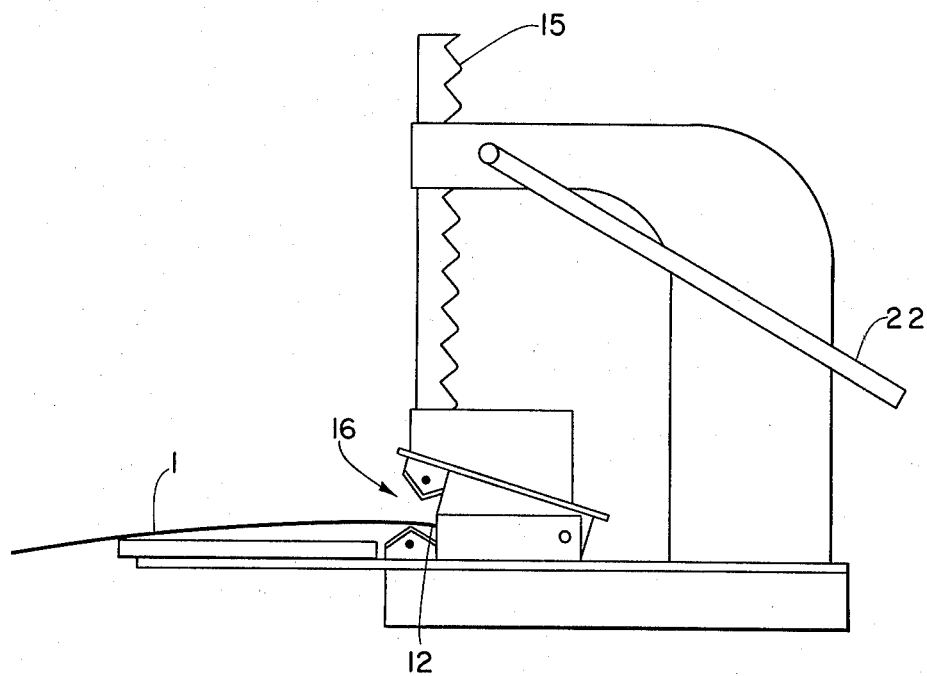
FIG. 3 is a side elevational view of a press which is adapted to separate the alternate conductors at the end of the cable as shown in FIG. 2.

The press shown in FIG. 3 is a commercially available Dake Press, which may be purchased from Dake Corporation. The press has been modified by some special tooling which enables the near end of the cable 12 to have the alternate conductors separated and forced up and down approximately ¼ inch from the near end 12 of the cable. The Dake Press 15 provides the force to do the separating and the knife blades 16, which form a part of the special tooling, sever the outer jacket of the cable and force the alternate conductors up and down. Thus, as will be seen later, all of the tip conductors point in one direction and all of the ring conductors point in the other direction.

Figure 4:
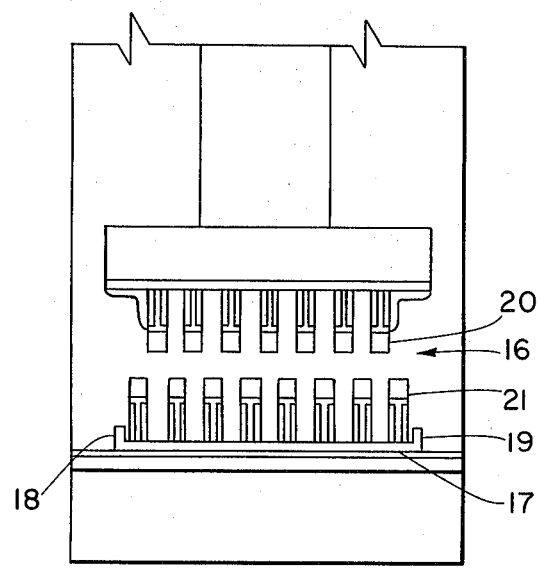
FIG. 4 is a partial elevational front view of the press of FIG. 3 showing a portion of the knife arrangement and guide, for separating the alternate conductors in the cable shown in FIG. 2.

FIG. 4 shows a partial front view of some of the knife blades and alignment guide means of FIG. 3. The cable is guided into the press by means of guide 17. That is, the sides of the cable rest against and are guided by means of shoulders 18 and 19. The knife blades include a top row 20 and a bottom row 21. After the near end of the cable 12 is placed between the knife blades 19 and 20, the press arm 22 is forced down, thus causing the teeth to mesh together in a scissor fashion and force the alternate conductors up and down. In the exemplification embodiment using a telephone cable, the tip conductors are forced in one direction and the ring conductors are forced in another direction. Each conductor of the cable precisely aligns with the surface of a knife included in the knife blades 16.

Figure 5:
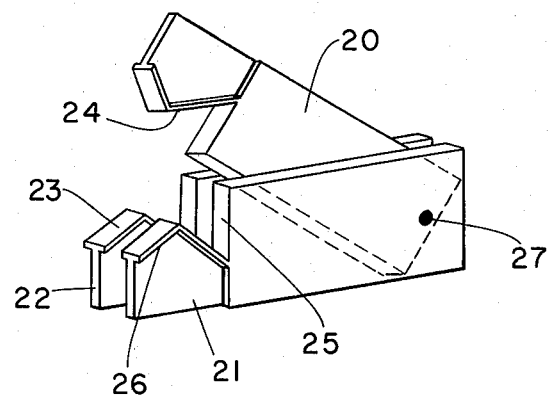
FIG. 5 is an isometric view showing, in more detail, several of the knives which are adapted to separate the alternate conductor in the cable shown in FIG. 2.

FIG. 5 shows in more detail the top and bottom blades 20 and 21. The width 22 of each blade is precisely the width necessary to separate each conductor, which in one embodiment is 0.041 inch. These knife blades should have substantially zero tolerance between them when they are closed so as to force the tip and ring conductors at the end of the cable up and down. The tip conductors rest on surface 23 and the ring conductors rest on surface 24. Of course, this alignment may be reversed by inverting the cable in the alignment guide 17. The end of cable 12 comes to rest against stop 25 after the cable is inserted into the Dake Press. The surface on which the conductors rest are slightly relieved by means of the detents 26, such that after the press has been activated, the conductors will be smoothly cut apart and the conductors will have enough clearance not to stick to the knife blades. The knife blades rotate about fulcrum pin 27.

Figure 6:
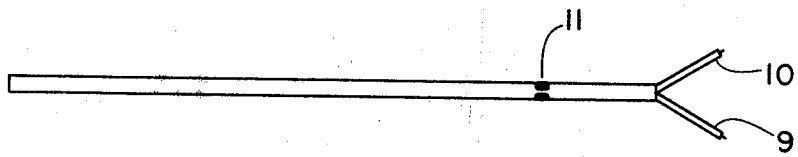
FIG. 6 is a side elevational view of the cable shown in FIG. 2.
Figure 7:
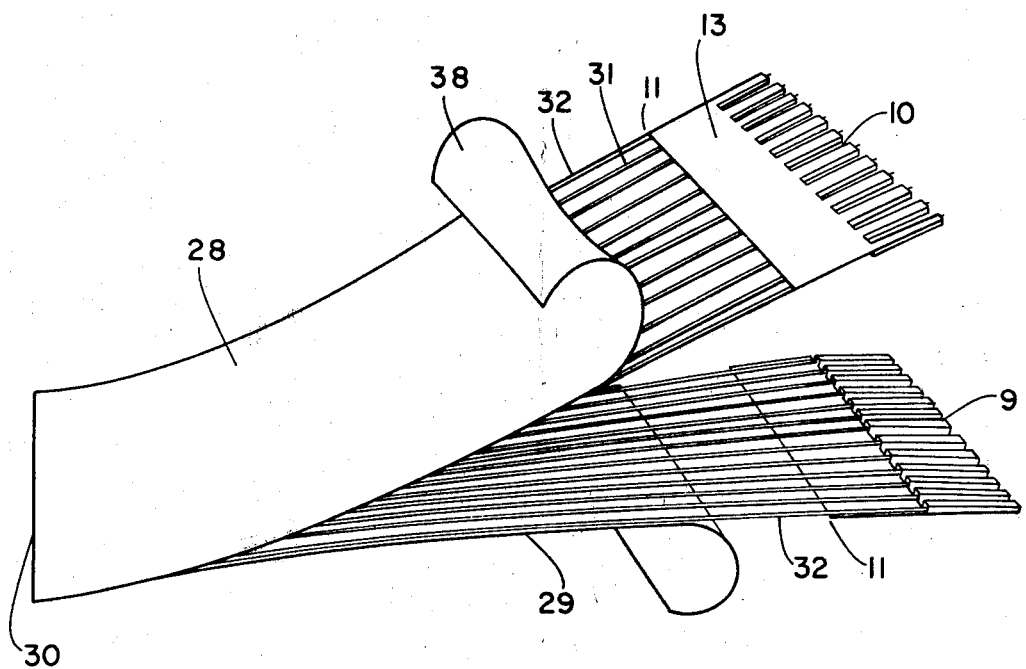
FIG. 7 is an isometric view showing the cable after some of the techniques of the present invention have been applied to the cable.

After the tip and ring conductors have been separated into groups 9 and 10, as shown in FIG. 6, the cable is removed from the Dake Press. The tip and ring conductor groups 9 and 10 are then respectively clamped by two fixtures such as a pair of sheet metal Vise Grips having wide flat jaws, which are manufactured by the Peterson Manufacturing Company and are available at most hardward stores. These Vise Grips are hand-held devices and, after clamping, the tip conductors in one pair or grips and ring conductors in another apir, they are pulled away from each other 180 degrees therefrom. One side of the cable is then separated from the other side, normally to about 2¼ inches from the near end of the cable. This separation is shown in FIG. 7. Thus, the tip and ring conductors are separated from each other and sides of the jacket of the cable are separated from each other.

After the tip and ring conductors have been separated from each other, each conductor group remains adhered to one side 28 of the cable jacket or the other side 29 of the jacket. The sides of the jacket are bent back along fold 30 on each side of the cable. The jacket sides 28 and 29 are then peeled back from the scored portion 11 to fold 30, thereby exposing the insulated conductors for termination. Normally, the insulation 3 around the conductors are made of a different plastic base material than the jacket 4. Thus the bond between the jacket and the insulated conductors is not very strong by design, permitting hand-peeling of the jacket away from the insulated conductors without significantly disrupting or distorting the parallel alignment of the conductors. In this embodiment, the insulation on the conductors is polypropylene and the jacket material is made of a mixture of polyvinylchloride and carbon black. The conductors are maintained in parallel alignment and are properly spaced relative to one another by leaving a portion or tab 13 of the jacket material adhered to the conductors towards the near end. Thus the conductors are properly aligned for mass termination.

During the scoring of the jacket at 11, a portion of the insulation from the insulated conductors is often inadvertently removed as indicated at nick 31. This hazard also occurs using prior art stripping techniques such as abrasion stripping. This nicking of the insulation about the conductor is particularly bothersome in the cable described with reference to FIG. 1 in that the conductive jacket could come in contact with one or more of the metallic conductors, causing a short circuit. Applicant has overcome this problem by selecting materials which only lightly adhere to each other, enabling the aforementioned ease in peeling the jacket from the conductor. The cable is then terminated to the connector well behind the nick 31 away from the near end of the cable. Applicant terminates his cable, for example, in the vicinity of 32, or further toward the far end of the cable, and, after or during termination, the portions between termination 32 and the end of the cable are removed, thus alleviating any problem of electrical shorts.

Figure 8:
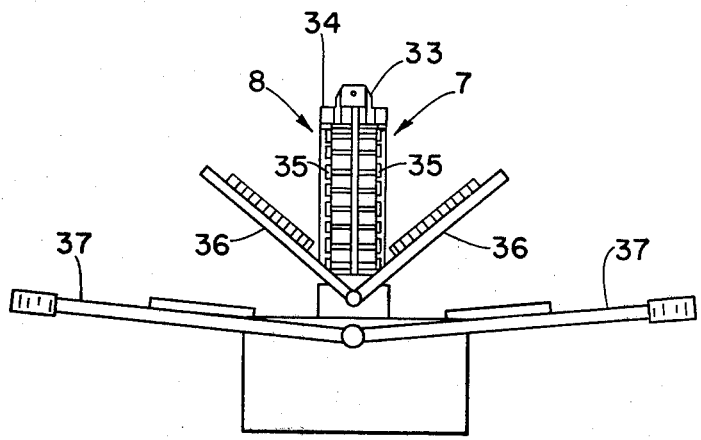
FIG. 8 is a front elevational view showing a tool for mass terminating the cable shown in FIG. 7.

Once the cable has been stripped, as shown in FIG. 7, the tip conductors 9 are placed on one side 7 of the termination tool shown in FIG. 8 and the ring conductors 10 are placed on the other side 8 of the tool. The connector tool may be an AMP Champ butterfly tool, available from AMP, Inc. and designated by AMP as a portable, hand-operated tool (MI-1).

Figure 9:
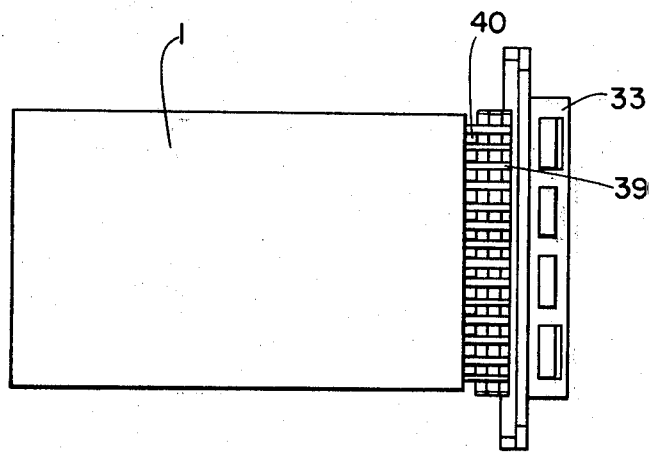
FIG. 9 is a top view showing the cable of in FIG. 7 terminated to a connector.

The tool shown in FIG. 8 includes a barrel 34 which is adapted to receive the AMP Champ connector 33 and is shown connected to a cable in FIG. 9. The connector has two termination sides, one side of which is adapted to receive the tip conductors and the other side adapted to receive the ring conductors of the cable in wire guide slots 36 and then transposed during tool operation to slots 35. Using prior art BMD cable for telephone application, each conductor had to be individually placed in each slot 35 by hand. The color coding of the conductors must follow the color coding which is printed on the top of the wire guides 36. However, applicant provides for one-shot mass termination of his cable since the tip and ring conductors of the flat cable have been separated from one another by a distance sufficient to slip the tip and ring conductors into the slots of the respective sides 7 and 8 of the connector holding barrel 34 all at the same time. Of course, the conductors in this flat cable are pre-arranged in the factory to conform with the telephone connection termination slots; therefore, color coding is not necessary. After the conductors are in place, locking and wire guide mechanisms 36 then are swung up against the connector barrel 34. This holds the cable in place during termination. Lever arms 37 are brought up together and forced against the connector barrel 34, which, in one stroke, terminates the cable to the connector and cuts off the excess cable above the termination point 32. Once terminated, the excess jacket material 38 may be trimmed from the cable, shown in FIG. 9, in order to keep the conductive plastic jacket from coming in contact with any metallic part of the connector or the base conductors. Thus, as shown in FIG. 9, the cable has been stripped and mass terminated to the connector 33. The tip connections 39 are shown on one side of the connector and the ring connections 40 are shown on the other side of the connector.

Thus, applicant has found a simple and unique method for mass terminating a flat cable which has certain unique properties and also unique problems due to its conductive jacket. However, applicant's method is also applicable to and may be used with other flat cables which do not have conductive jackets.

From the foregoing description of the illustrative embodiment of the invention, it will be apparent that many modifications may be made therein. It will be understood, therefore, that this embodiment of the invention is intended as an exemplification of the invention only, and that the invention is not limited thereto. It is to be understood, therefore, that it is intended that the impending claims are to cover all the modifications that shall fall with the true spirit and scope of the invention.

I claim:

1. A method for preparing a flat cable having a plurality of substantially parallel wires for gang termination in a connector with opposite rows of contacts on its respective sides comprising: cutting through the jacket of the cable at an end thereof and forming portions of every other wire of the cable down and the remaining ones up, grasping the downturned wire ends and separately grasping the upturned ones, and pulling said wire ends in opposite directions separating one side of the cable jacket from the other side leaving two spaced parallel groups of wires ready for termination in a connector.

2. A method of stripping a jacket from the end of a multi-conductor flat cable comprising the steps of:
   (a) scoring each side of the jacket across the width of the cable a first predetermined distance from the near end of the cable to a depth in the jacket substantially reaching the insulated conductors;
   (b) separating alternate insulated conductors into two groups such that a portion of each conductor in a group points in the same direction for a second predetermined distance from the near end of the cable, said groups of conductors pointing in different directions;
   (c) simultaneously pulling one group of conductors in a direction away from the other group, thereby separating one side of the cable jacket from the other side;
   (d) peeling the jacket away from the insulated conductors on both sides of said cable beginning at said scoring, thus exposing said insulated conductors, whereby said exposed insulated conductors may be readily gang terminated to a connector.

3. A method as set forth in claim 1, further including the step of gang terminating said insulated conductors to a connector.

4. A method as set forth in claim 1 wherein the step of scoring at said first predetermined distance is made at a position on said jacket at a greater distance from the near end of the cable than said second predetermined distance.

5. A method as set forth in claim 4, further including the step of maintaining each of said conductors in each group parallel to and equidistant from one another for most of the length of the cable prior to and during termination.

6. A method as set forth in claim 5, wherein said conductors are maintained parallel and equidistant by the step of leaving portions of said jacket between the near end of the cable and said scoring adhered to each group of conductors prior to termination.

7. A method as set forth in claim 1 further including the step of providing materials for said conductors insulation and said jacket of sufficiently different types to ensure that the bond there between is weaker than the bond between the opposing sides of the jacket so as to facilitate said peeling step.

8. A method as set forth in claim 6 further including the steps of providing a mixture of polyvinylchloride and carbon black for said jacket and providing a polypropylene material for said conductor insulation.

9. A method as set forth in claim 1 wherein said step of separating is accomplished by aligning each alternate conductor with the blades of an implementing tool, the ends of said blades facing alternately in opposite directions, and applying sufficient force to said conductors by said blades to separate said conductors from each other.

10. A method as set forth in claim 3 further including the steps of severing the cable between the termination point and the near end of the cable and removing the excess cable.

11. A method as set forth in claim 1 further including the step of providing an electricallyconductive material for said jacket.

* * * * *